United States Patent Office 3,400,923
Patented Sept. 10, 1968

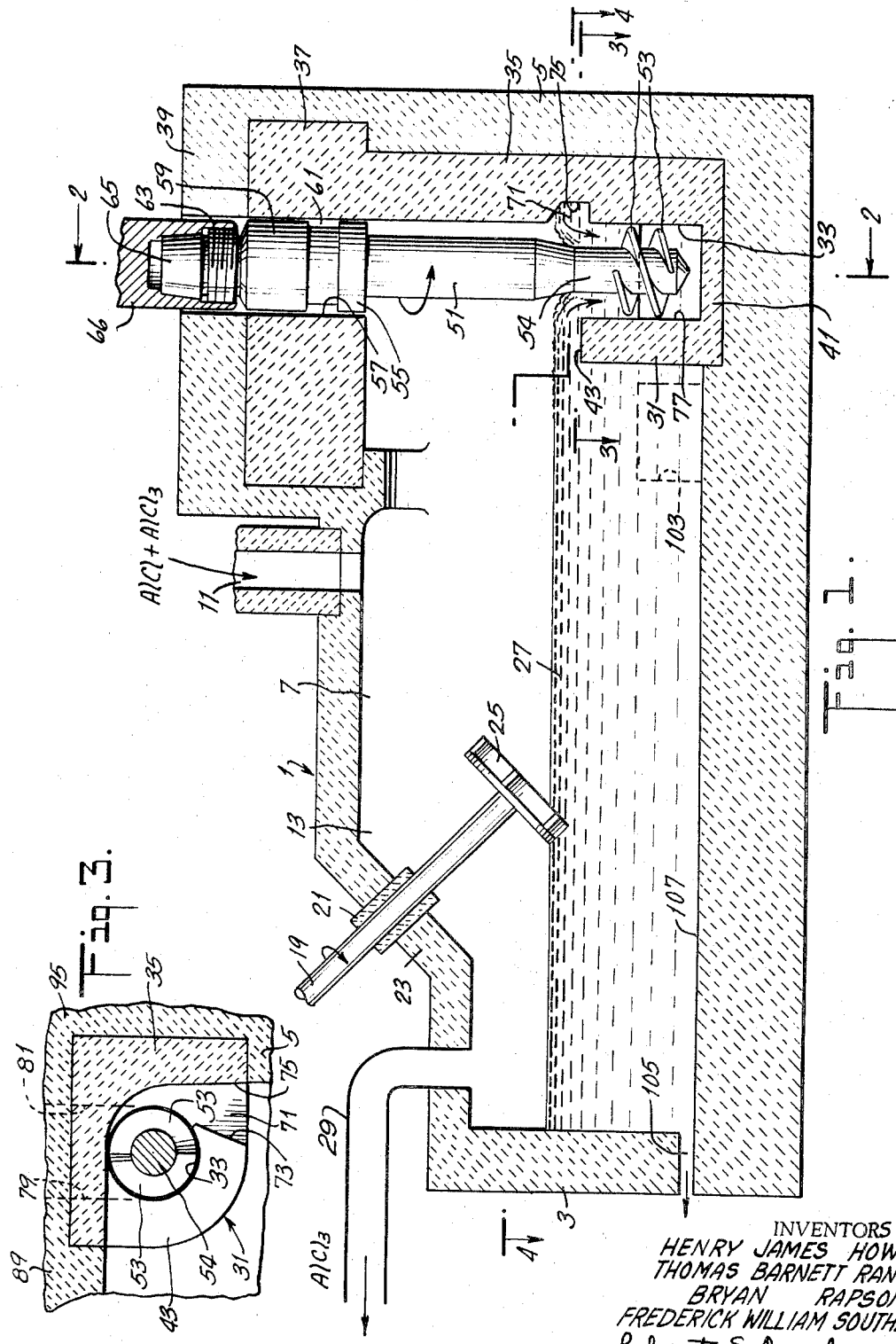

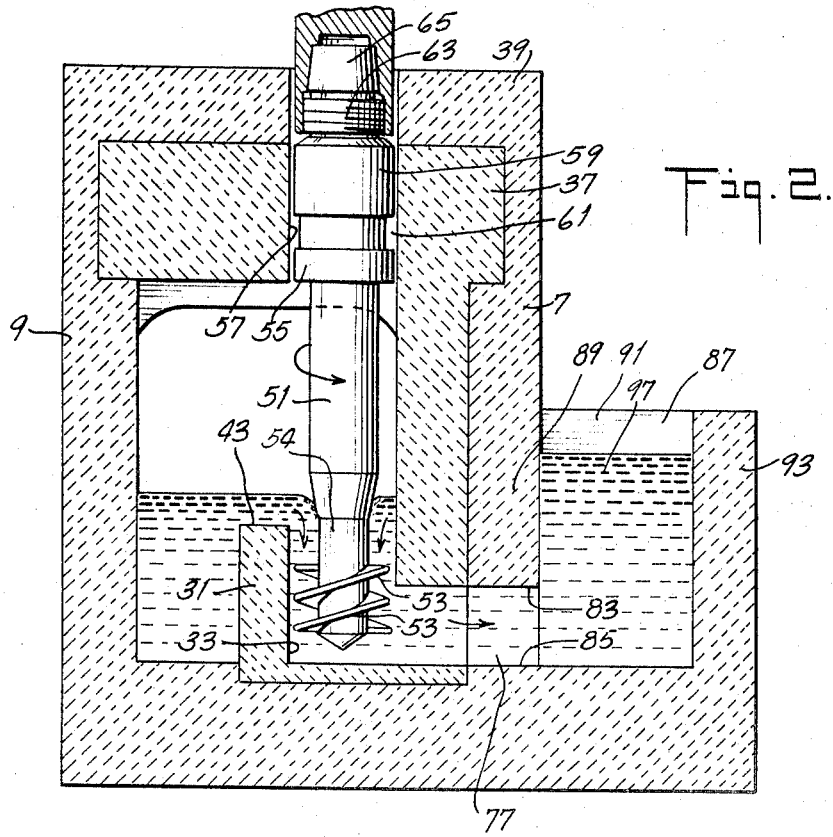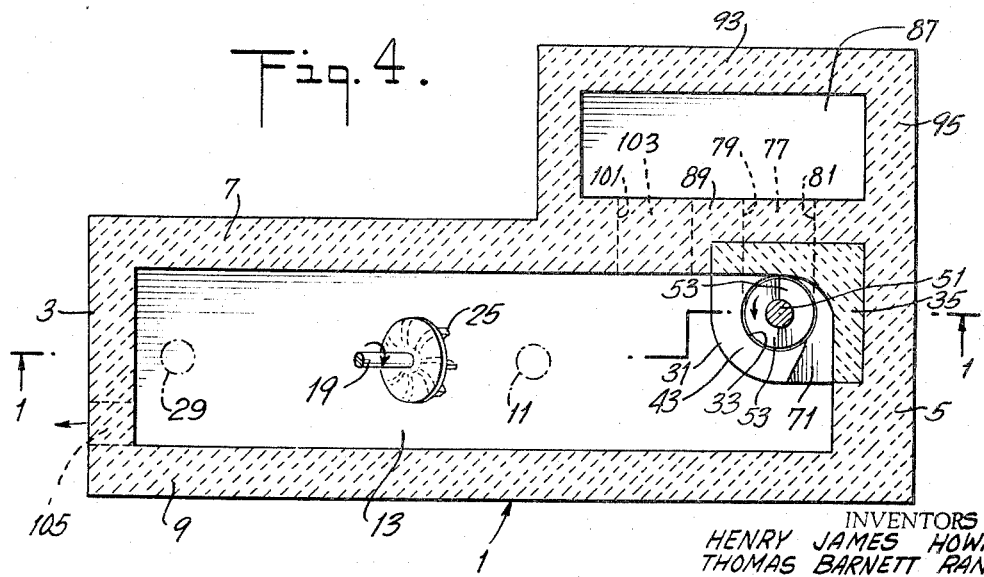

3,400,923
APPARATUS FOR SEPARATION OF MATERIALS FROM LIQUID
Henry James Howie, Thomas Barnett Rance, Bryan Rapson, and Frederick William Southam, Arvida, Quebec, Canada, assignors to Aluminium Laboratories Limited, Quebec, Quebec, Canada, a corporation of Canada
Filed May 15, 1964, Ser. No. 368,456
9 Claims. (Cl. 266—37)

This invention in its broadest aspect relates to a process and apparatus for separation of refuse materials from a liquid on which the refuse floats. The invention especially relates to the removal and separation of dross from molten metals. The invention particularly relates to the removal and separation of dross from molten aluminum being produced in a continuous process, including the process of distillation of the aluminum from a halide of aluminum.

The so-called catalytic distillation of metals, particularly aluminum, in dissociating halide form, is well known and the general process of distillation of aluminum in subhalide form is described in Patent No. 2,723,911 to Phillips, Rapson and Hollingshead, issued Nov. 15, 1955. This process may include the distillation from base materials or compositions which include alloys of aluminum and other metals or elements.

As disclosed in the patent, the aluminum containing material is treated with a normal aluminum halide, e.g. trichloride or tribromide, in the vapor phase at an elevated temperature, this temperature being below the temperature at which metallic aluminum would be vaporized to any appreciable degree. The vapor thereby produced includes a corresponding subhalide of the aluminum, i.e. the monohalide, for example, the monochloride or monobromide. This monohalide such as the monochloride, however, may be mixed with the higher aluminum halide, for example the usual aluminum trichloride, both of which will be in vapor form at the temperature utilized. The reaction is represented by the formula

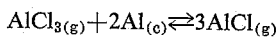

$$AlCl_{3(g)} + 2Al_{(c)} \rightleftharpoons 3AlCl_{(g)}$$

The reference letter subscripts represent respectively the gaseous state and the condensed metal state.

In such a process the gaseous materials including the monohalide may be passed from a converter where the reaction takes place to produce the monohalide into a decomposer where, as by coming in contact with molten aluminum which is at a temperature sufficiently lower than the monohalide, the reverse reaction takes place and effects deposition of the aluminum, which, in the type of decomposer just described, drops into the molten bath. Intimate contact of the monohalide, especially the monochloride, is effected by producing a spray of the molten metal by means of a splasher within the decomposer; among others, one suitable splasher arrangement comprises an impeller rotating on a shaft disposed preferably at an angle to the vertical, as shown in the Patent No. 2,914,398 to Johnston and Southam, issued Nov. 24, 1959. This action within the decomposer normally takes place at a pressure which is somewhat above atmospheric pressure to prevent entry of air adversely effecting the reaction. As disclosed in the Patent No. 2,723,911 in this conventional process of producing purified molten aluminum from the monochloride there is usually a considerable amount of unreacted gaseous aluminum trichloride carried into the decomposer with the monochloride, and of course, the decomposition of the latter re-establishes the trichloride, so that the exit gas from the decomposer is essentially aluminum trichloride.

Because of the impurities carried by the initial base materials dross is produced in the decomposer appearing to consist for the most part of aluminum oxide, aluminum nitride and aluminum carbide. That is to say, the substances which up as dross on the molten metal in the decomposer are believed to be formed by reaction of aluminum trichloride or monochloride with impurities, including traces of air and moisture, carried in or with the base aluminum-containing material entering the converter, the latter material being, for example, a so-called carbothermic alloy. This dross tends to float and accumulate on the surface of the aluminum within the decomposer. If such accumulation were allowed to continue not only would the efficiency of the decomposer be reduced but eventually the operation of the decomposer would become ineffective because the desired contact of the molten metal with the monohalide would not be secured. Incrusting of the refractories also would occur.

While these conditions are well understood, the problem of removing the dross from the decomposer chamber has not been satisfactorily solved. Remotely-operated skimming devices of a mechanical nature appear impractical because the common structural metals of which they might be made have some solubility in molten aluminum, to the extent of destroying the device and contaminating the aluminum. It is not practical and indeed is extremely hazardous to open the splashing chamber of the decomposer while the operation is continued. It is highly desirable, moreover, to carry on the operation as a continuous process both from the standpoint of efficiency and for removing the dross from this decomposer chamber if this can be accomplished in a safe and practical manner.

It is an object of the invention to provide a process and apparatus for carrying out the process of producing a refuse-free liquid as a continuous operation.

It is another object of the invention to provide, in a conventional process and apparatus for producing aluminum from a monohalide (more specifically a monochloride), efficient means and methods for effecting continuous removal of the dross without the necessity of opening the decomposer chamber.

It is a further object of the invention to provide in such a conventional process a continuously operating means which will withdraw the dross, together with a portion of the molten aluminum, into a well or receiver exterior to the normal apparatus, in which receiver the dross may be separated and the molten aluminum returned to the decomposer.

It is a still further object of the invention to provide simple dross removal apparatus which may be auxiliary to the conventional decomposer and may be provided by simple structural features within the conventional structure of the decomposer or in addition thereto.

It is another object of the invention to provide a removal means which will withstand the heat and the action of the molten aluminum and the halide atmosphere without deterioration and especially without causing contamination of the aluminum being produced.

It is a feature of the invention that, auxiliary to and conveniently within the conventional chamber, such as a decomposer, that contains the liquid or molten metal upon which the refuse or dross floats, means are provided for forming or defining a pool of the liquid, to provide for advance to or accumulation in this pool of the refuse or dross floating on the liquid. More specifically in connection with the process of producing aluminum from a monohalide this means is of such form that it may be disposed within the decomposer for collecting in or drawing into the pool both molten aluminum from the decomposer and the dross floating on the aluminum in the decomposer.

A significant aspect of the invention is that the pool is provided with means for effecting withdrawal therefrom of both a portion of the liquid, specifically the molten aluminum, and the refuse, the dross floating on the aluminum in the pool, downwardly through the pool structure so that the aluminum and dross from the decomposer chamber will move into the pool at the upper part thereof to replace the materials withdrawn from the pool. Within the scope of the invention different means may be provided for effecting this downward movement of aluminum and dross but preferably a rotary element providing a helicoidal surface is utilized rotating on a vertical axis and cooperating with a confining surface of the pool structure to effect the downward movement of both molten aluminum in the pool and of the dross floating thereon. Thus such apparatus comprises a pump having a rotor in the form of a screw, and a cylindrical housing or shroud therefor, being the pool-defining structure described above.

A structure providing a well also is provided in which the withdrawn aluminum and dross will be separated. This well may be disposed immediately adjacent the portion of the decomposer in which the pool is disposed. A flow passage is provided connecting the bottom portion of the pool with the bottom portion of the well, so that the materials which are withdrawn from the pool are delivered through this flow passage into the well and the dross then may accumulate on the surface of the molten metal in the well. It will be understood that the design may be such that, although the decomposer is operated at a pressure which is somewhat above or below atmospheric pressure, the pressure in the well will be that of the atmosphere and the dross may be skimmed from the molten metal in the well by any suitable means without the hazards of the conditions which obtain within the decomposer.

This means for separating the dross in the well may be conventional and is not part of the present invention. The structure of the apparatus of the invention, however, includes a return passage connecting from the space occupied by the molten metal in the well to the body of molten metal in the decomposer, so that no substantial loss of the molten metal is experienced and the dross may be removed while the operation of effecting the production of the gases in the converter and the deposition of the aluminum from the monohalide in the decomposer may be carried on without interruption.

These and other features of the invention will be more clearly understood from the description of the drawings to follow in which:

FIG. 1 shows in longitudinal section a conventional decomposer provided with the dross removal means of the invention;

FIG. 2 is a section on line 2—2 of FIG. 1;

FIG. 3 is a section on line 3—3 of FIG. 1;

FIG. 4 is a horizontal section on line 4—4 of FIG. 1.

The main structure of the conventional decomposer 1 is shown in section in FIGS. 1 and 4 and provides the vertical walls 3, 5, 7 and 9 defining a container for the molten aluminum deposited therein from the monohalide, for example, aluminum monochloride ordinarily delivered from the converter through a refractory-lined inlet conduit 11 together with a certain amount of aluminum trichloride. The gaseous monochloride and the trichloride which have been produced in the conventional converter are at a temperature somewhat above the deposition temperature as they enter the chamber 13 of the decomposer, FIGS. 1 and 4. As disclosed in the above mentioned Patent No. 2,914,398, the decomposer may be provided with a rotatable shaft 19 supported in a suitable bearing 21 in an inclined portion 23 of the upper wall of the decomposer. The shaft 19 carries on its lower end a suitable rotary splashing device, such as a multiple-vane impeller 25, dipping partly into molten metal 27. Suitable means, not shown, are provided for effecting rotation of the shaft 19 so that the vanes of the device 25 successively are dipped into the body of the molten aluminum 27 within the chamber 13. The dipping of the blades 25 carries up and effects a splashing of the molten aluminum, creating an intense spray of the latter. Because this molten material is at a lower temperature than the gaseous aluminum monochloride, the resulting intimate contact of the splashed particles with the incoming gaseous aluminum monochloride secures the deposition of the aluminum from the gaseous material in accordance with the reverse reaction indicated above. This reverse or decomposing reaction results in the production of aluminum trichloride which, with any aluminum trichloride delivered to the decomposer, may be withdrawn through the conduit 29 rearwardly of the impeller 25 as shown in FIG. 1.

As above mentioned, the dross resulting from the impurities in the initial base material will float on the surface of the body 27 of molten aluminum within the chamber 13. Unless this floating dross were removed it would accumulate and interfere not only with the splashing action of the impeller 25 to bring the molten aluminum into contact with the monochloride but also would tend to contaminate the aluminum produced as well as to accumulate on and encrust the walls of the decomposer.

In accordance with the invention in a corner of the decomposer, as may be seen in FIG. 4, a structure comprising a wall or shroud 31 is disposed which extends from the rear wall 7 to the right hand wall 5 and provides also a cylindrical surface 33 upon a vertical axis which defines the pool. The wall 31 as indicated in the drawings is of refractory material and is connected to the wall 35 of the pool structure which extends upwardly at the right of FIG. 1 and which connects with the roof wall 37. This roof wall may be formed in such a manner that the closing top wall 39 of the decomposer holds the wall 37 in place for cooperation with the wall 35 and the wall 31, together with the bottom wall 41, to define a pool structure which cooperates with the means for withdrawing molten aluminum and dross from the pool.

It will be noted that the wall 31 is of such height that the top 43 thereof is somewhat below the level of the body 27 of aluminum and the dross floating thereon, and as shown in FIG. 4, the wall 31 defining the dross removal pool, is situated at an end of the chamber, in effect facing the impeller 25. This arrangement makes it possible for the impeller 25, as it rotates and splashes the aluminum, also in effect to drive the dross toward the pool which is defined by the cylindrical surface 31 as described. The walls and other structural parts of the decomposer and the walls of the pool may be made of a suitable refractory, for example, of carbon, graphite, alumina or the like.

In the preferred embodiments being described, disposed upon the axis of the cylindrical surface 33 is a rotatable member 51 which carries inclined rotary propelling elements, e.g. screw flights providing helicoidal surfaces extending about the vertical axis. In the embodiment shown in the drawings two helicoidal elements 53 are provided to form a double screw. The peripheries of these helicoidal elements are disposed adjacent but with clearance with respect to the vertical cylindrical surface 33 that defines the pool. The rotatable member 51 in its portion 54 carrying the screw elements 53 is of such reduced diameter that there is space for downward flow of both aluminum and dross from the portion of the molten material above the top 43 of the wall or shroud 31 and this downward movement is effected by the helicoidal elements 53 upon rotation of the member 51 in the proper direction, counterclockwise in FIG. 4 for the elements 53 as shown in FIGS. 1 and 2. The intermediate portion of the screw pump member 51 above the level of the molten material is somewhat larger than the portion 54. The upper portion of the rotatable member 51 is further enlarged with respect to the intermediate portion. This enlarged upper portion provides a collar or flange 55 which is dimensioned so that its cylindrical surface is disposed closely adjacent but with clearance with respect to the cylindrical surface 57 of an opening which extends upwardly through the roof wall 37 and through the top wall 39 of the decomposer, thereby to prevent particles of aluminum or of the dross which are splashed upwardly from passing up and freezing between the surface 57 and the upper part of the rotatable member 51. This member 51 is continued upwardly with a portion 59 of the same diameter as the collar 55, the space 61 shown between the collar 55 and the portion 59 being utilized for a clamp to support the rotatable member 51 when outside the decomposer, e.g. when it has been withdrawn and when it is being attached to or removed from a coupling member as described below.

The upper end portion of the member 51 is provided with a cylindrical male thread at 63 and with a tapered end section 65 for centering purposes. The thread of the section 63 is of such pitch and size as to provide for engagement with a correspondingly (female) threaded screw coupling formed in the lower end of a vertical shaft 66 of heat resisting alloy steel. Depending upon the direction of the pitch of the helicoidal elements 53, and, therefore, of the rotation of the member 51, the threads 63 are formed in such direction of the pitch that the coupling as it is rotated by a motor, not shown, to which it is operatively connected will maintain the coupling in threaded relation to the upper end threaded portion of the member 51. Thus where the double screw flights 53 are right hand threads and the screw member 51 is turned counterclockwise (as seen from above) to draw the metal and dross downward, the upper portion 63 for coupling connection should have a left hand thread. The coupling and the stainless steel shaft 66 may be water cooled and the shaft may pass through appropriate seals and bearings to support it for rotation thereof on the vertical axis in the position shown in the drawings. A conventional speed reducer unit (not shown) providing for variable speed output also may be utilized having, for example, a ratio of 3 to 1 in order that the speed of rotation of the member 51 may be suitable for its action in the molten aluminum while utilizing normal commercial speeds for the motor.

As shown in FIGS. 3 and 4 and indicated in the right of FIG. 1 a shallow channel 71 may be formed at the upper end of the wall 31. This channel is defined by a vertical surface 73 and a vertical surface 75, FIG. 3. The vertical surface 75 may be tangent to the inner surface of the wall 35 which may be coplanar with the inner surface of the end wall 5 of the decomposer. The vertical surface 73 is disposed in inclined relation to the surface 75 and tangentially to the cylindrical surface of the pool within the wall 31. The bottom surface of the channel 71 is disposed a short distance below the top surface 43 of the wall 31. Thus, as molten metal is moved toward the right in FIGS. 1 and 4, the channel 71 promotes its advance into the corner behind the screw, avoiding a deficiency at this location such as might otherwise result in gas being pumped. In this fashion, the metal is adequately supplied in full peripheral relation to the screw elements 53, it being understood that equivalent results without the channel are attainable by spacing the pool-forming wall or shroud for the screw sufficiently outward from the walls of the chamber.

As shown in FIGS. 1 and 2, more generally, the level of the molten aluminum within the chamber 13 is somewhat above the top 43 of the wall 31 and rotation of the screw member 51 is effective to drawn downwardly over this wall both the molten aluminum and the dross from the body thereof which is adjacent the top portion of the pool.

As shown in FIGS. 2, 3 and 4 an outflow channel 77 of rectangular shape defined by vertical walls 79, 81 and by top and bottom surfaces 83, 85 connects from the bottom portion of the pool to a well 87 defined by walls 89, 91, 93, 95. This well is open at the top and the level of the molten aluminum and the dross which have been forced through the conduit 77 by the rotatable member 51 and its screw elements 53 may stand somewhat below or above the level of the molten aluminum and dross in the chamber 13 depending upon the degree of pressure above or below atmosphere carried in the chamber 13. It will be understood, however, that the pumping screw 53 forces both the aluminum withdrawn from the pool and the dross into the bottom portion of the well 87 and that the dross then may be allowed to rise and accumulate at the top surface of the molten metal 97 in the well, so that the dross may be skimmed off the top surface of the metal and disposition thereof made in any suitable manner.

As shown in FIGS. 1 and 4 a return channel or conduit 101 having refractory walls extends from the well structure at a point spaced from the channel 77 and passes through the walls 89 and 7, in the same manner as and in parallel with the channel 77, so as to open into the decomposer below the level of the body of molten metal therein. This opening of the passage or channel 101 at 103 in the wall 7 of the decomposer, at a locality spaced from the channel 77 and the wall or shroud 31, provides for return of the molten metal from the well after separation of the dross therefrom which has been allowed to rise to the surface of the metal in the well 87. Thus, no loss of the molten metal occurs. Any dross which might under some conditions be returned through the conduit 101 again will float to the surface of the molten metal in the chamber 13 and be moved toward the pool so as to be withdrawn by the action of the rotatable member 51 in the manner described.

While the well 87 is shown in a disposition in which the movement of the metal and dross into this well is generally at right angles to the movement of the metal through the chamber 13 toward the pool, within the scope of the invention the well may be disposed in other positions in relation to the end of the decomposer 1 toward which the dross is moved as by the action of the impeller 25 upon rotation of the shaft 19, and by the pumping action of the member 51 itself. The wall 31 and the cylindrical surface 33 defined thereby may be disposed in a different relation to the decomposer walls and to the walls of the well 87 than that shown in FIG. 4. In any such case, by properly disposing the channel 77 connecting the pool to the well the flow of the molten metal and the dross may be confined so as to flow from the pool to the well. The channel or conduit 101 also may then be suitably modified as to form and length so as to effect return to the chamber 13 of the separated metal in the manner described.

As shown in FIGS. 1 and 4 a draw-off passage 105 is provided adjacent the bottom surface 107 of the chamber 13 for drawing off the purified aluminum in the molten state into molds or other receivers of desired form and function. It will be understood that the decomposer may include other features necessary for its operation but not related to the present invention, and therefore not shown in the drawings, such as heating means for initially establishing a body of motlen metal of suitable character, and cooling means for removing heat from the molten body during operation, i.e. the heat of decomposition of the monochloride. If desired, other forms of splashing devices may be used instead of the impeller 25 shown, and other arrangements of gas inlet and outlet than the passages 11 and 29 opening through the roof as in FIG. 1, as for instance an inlet in the end wall 5 spaced from the region of the member 51 and an outlet in an opposite end well behind the splash impeller 25.

Within the scope of the invention also the wall 31 and the cooperating walls 35, 37 may be made of any suitable refractory material which will withstand the heat and provide the requisite mechanical strength. The rotatable member 51 also may be made of different materials for different purposes. Thus refractories suitable for these various parts include alumina, graphite, carbon and various other materials or combinations of materials that are sufficiently strong and inert to attack under the conditions of use. When effecting the decomposition of an aluminum monohalide, particularly aluminum monochloride, in the process above described the walls 31, 35, 37 preferably are made of alumina, the rotatable member 51 preferably being made of graphite for ease of machining.

It is found in the refining of aluminum, with a rotatable screw member 51 having a diameter at the small end of 6 inches and with a diameter of the helicoidal members 12 inches, that the diameter of the middle portion may be 8 inches and the diameter of the collar 55 and of the portion 59 may be 12 inches, the diameter of the reduced portion providing recess 61 being 10½ inches. With a rotatable member 51 of such dimensions it is found that the depth of the metal over the top 43 of the wall or shroud 31 may be substantially at a minimum of one inch. With this minimum depth the optimum speed of rotation of the screw member 51 is 150 r.p.m. In Table I are given these and other optimum data for depths over the top of the wall 31, of 2, 3 and 4 inches. The net power consumption of the screw at the optimum speed also is given in Table I. The top ends of the propeller (screw) elements should preferably be at least four inches below the top 43 of the wall 31 to prevent turbulence and to secure a smooth vortex, it being found that turbulence in the vortex tends to entrainment and pumping of gas.

TABLE I

| Metal depth over surface 43 (inches) | Optimum screw speed (r.p.m.) | Net power consumption of screw at optimum speed (kw.) |
| --- | --- | --- |
| 1 | 150 | 0.26 |
| 2 | 195 | 0.44 |
| 3 | 260 | 0.9 |
| 4 | 325 | 1.5 |

It is found further that this apparatus may be used for removal of floating materials other than the dross on the molten aluminum. Thus the described screw pump has been effective for removing not only natural dross but larger bodies, experimentally exemplified as half inch cubes of graphite, these cubes being withdrawn from the pool and delivered to the well in the manner described. The apparatus also may be used for similar applications with other molten metals than aluminum, and with other liquids, including the removal of a lighter liquid immiscible in the main liquid. Wood chips have been removed from the surface of a body of water by utilizing the rotary member and its helicoidal, i.e. screw elements as described. Moreover, by adjusting the speed of the rotatable member 51 in relation to the depth of the liquid over the top of the wall 31 it is found that gas also may be pumped through the pool to the separating well where this is desirable. In the case of separation of dross from the molten aluminum in the decomposer of a monochloride distillation system, which is the field of application of the invention being described, this pumping of gas is undesirable and the depth of the metal over the top of the wall or shroud 31 is preferably not less than about one and a half (1½) inches with a minimum speed of about 150 r.p.m.

Stated more generally it is found that with a screw dimensioned as described above, the minimum depth of metal over the shroud, say one inch or possibly somewhat less, is that which will ensure desired flow of metal and dross down into the shroud. At metal depths (over the shroud) up to about one and a half inches, the screw speed should be well above 125 r.p.m. to insure pumping of dross, and less than about 175 r.p.m. to avoid pumping of gas. At greater depths of immersion of the shroud (i.e. greater metal depths over the surface 43), the screw speed (or speed range) necessary to pump dross but not gas increases with such depth, as exemplified in Table I; for instance, at 3 inches immersion, the optimum speed is about 260 r.p.m., within a possible range of about 235 to 280 r.p.m.

Other variations may be made in the structures utilized and in the form of and the materials used for the pool and the rotatable member 51 to accomplish the downward movement of both metal and dross, their delivery to the exterior well and the separation of the dross from the metal in this well without necessitating access to the decomposer chamber. As indicated above this may be accomplished without substantial loss of the purified metal which may be returned to the decomposer from the well. All such variations are intended to come within the scope of the appended claims.

We claim:

1. In combination with a confined chamber having a floor and filled with a body of liquid at least to a predetermined level above said floor, apparatus for removing from the chamber refuse material carried on the surface of said body, said apparatus comprising:

(a) means including a wall extending upwardly from the floor of said chamber for defining a pool within said chamber, said wall having an upper edge with at least a portion lower than said predetermined level for admitting liquid and refuse material carried therewith from the surface of said body to said pool, said wall being disposed and adapted to permit flow of liquid from said body into said pool only over said upper edge, and said wall and chamber being mutually arranged to permit direct flow of liquid into said pool from the entire surface of said liquid body;

(b) means providing a well disposed externally of said chamber and extending below said predetermined level for receiving liquid from said pool, said well communicating with the interior of said pool through a first passage opening into said pool at a level below the level of said upper wall edge portion, said well communicating directly with said chamber through a second passage opening into said chamber externally of said pool and at a level below said predetermined level, said well being arranged to permit separation of said refuse material from liquid therein; and (c) means for advancing liquid and refuse material downwardly in said pool, to cause circulation of liquid from said pool into said well through said first passage and thence into said chamber through said second passage while drawing liquid from the surface of said body together with said refuse material into said pool over said wall edge thereby to effect delivery of said refuse material with said liquid into said well.

2. In combination with a confined chamber having a floor and filled with a body of liquid at least to a predetermined level above said floor, apparatus for removing from the chamber refuse material carried on the surface of said body, said apparatus comprising:

(a) means including a wall extending upwardly from the floor of said chamber for defining a pool within said chamber, said wall having an upper edge with at least a portion lower than said predetermined level for admitting liquid and refuse material carried therewith from the surface of said body to said pool, said wall being disposed and adapted to permit flow of liquid from said body into said pool only over said upper edge, said wall and chamber being mutually arranged to permit direct flow of liquid into said pool from the entire surface of said liquid body and said pool having an outlet passage opening into said pool at a level below the level of said upper wall edge portion for discharge of liquid from said pool to a locality external to said chamber;

(b) a rotatably driven pump screw having a blade disposed in said pool below said predetermined level, for advancing liquid and refuse material downwardly in said pool, to cause discharge of liquid and refuse material from said pool through said outlet passage while drawing liquid from the surface of said body together with said refuse material into said pool over said wall edge; and (c) means providing a well disposed externally of said chamber and extending below said predetermined level for receiving liquid from said pool, said well communicating with the interior of said pool through said outlet passage and communicating directly with said chamber through a second passage opening into said chamber externally of said pool and at a level below said predetermined level so that circulation of said liquid from said pool to said well by said pump screw effects concomitant return circulation of liquid from said well to said chamber through said second passage, said well being arranged to permit separation of said refuse material from liquid therein.

3. Apparatus as defined in claim 2, wherein the inner surface of said wall defining said pool is of cylindrical configuration about a vertical axis and wherein said pump screw comprises a propeller element suspended in said pool and bearing a helicoidal blade extending about said vertical axis for rotation about said axis, the periphery of said blade being disposed in closely adjacent spaced relation to said inner wall surface.

4. Apparatus as defined in claim 3, wherein said liquid is molten metal and wherein said wall and said pump screw are fabricated of refractory materials inert with respect to said molten metal.

5. Apparatus as defined in claim 4, wherein said molten metal comprises aluminum, and said pump screw is fabricated of graphite.

6. Apparatus as defined in claim 3, wherein said wall is so disposed and arranged that said liquid can flow from said body into said pool over a first portion of said wall edge but not over a second portion of said wall edge, and wherein said first portion of said wall edge has a channel formed therein, extending from the outer surface of said wall to the inner surface of said wall and shaped and positioned to conduct a flow of said liquid and refuse material from the surface of said body into said pool in a direction tangential to the periphery of said pool, said channel opening into said pool adjacent said second portion of said wall edge.

7. Apparatus as defined in claim 2, wherein said chamber is adapted to receive a flow of gas above the surface of said liquid body, and including spray-projecting means for splashing liquid of said body through said flow of gas in said chamber, said spray-projecting means being disposed and adapted to advance refuse material-carrying liquid of said body toward said pool.

8. In an aluminum subhalide distillation system, in combination with a confined gas-tight chamber having a floor and filled at least to a predetermined level above said floor with a body of molten metal comprising aluminum, and means for conducting a flow of gas comprising at least one gas selected from the class consisting of gaseous halides and subhalides of aluminum into and through said chamber above said body, apparatus for removing from said chamber dross carried on the surface of said body, said apparatus comprising (a) means including a wall extending upwardlly from the floor of said chamber for defining a pool within said chamber, said wall having an upper edge with at least a portion lower than said predetermined level for admitting molten metal and dross carried therewith from the surface of said body to said pool, said wall being disposed and adapted to permit flow of molten metal from said body into said pool only over said upper edge, said wall and chamber being mutually arranged to permit direct flow of molten metal into said pool from the entire surface of said body, and said pool having an outlet passage opening into said pool at a level below the level of said upper wall edge portion for discharge of molten metal from said pool to a locality external to said chamber;

(b) a rotatably driven pump screw having a blade disposed in said pool below said predetermined level, for advancing molten metal and dross downwardly in said pool to cause discharge of molten metal and dross from said pool through said outlet passage while drawing molten metal from the surface of said body together with said dross over said wall edge; and (c) means providing a well disposed externally of said chamber and extending below said predetermined level for receiving liquid from said pool, said well communicating with the interior of said pool through said outlet passage and communicating directly with said chamber through a second passage opening into said chamber externally of said pool and at a level below said predetermined level so that circulation of said liquid from said pool to said well by said pump screw effects concomitant return circulation of liquid from said well to said chamber through said second passage, said well being arranged to permit separation of said refuse material from liquid therein.

9. In an aluminum subhalide distillation system, in combination with a confined gas-tight chamber having a floor and filled at least to a predetermined level above said floor with a body of molten metal comprising aluminum, means for conducting a flow of gas comprising at least one gas selected from the class consisting of gaseous halides and subhalides of aluminum into and through said chamber above said body, and spray-projecting means disposed in said chamber for splashing molten metal of said body through said flow of gas in said chamber, apparatus for removing from said chamber dross carried on the surface of said body, said apparatus comprising (a) means including a wall extending upwardly from the floor of said chamber for defining a pool within said chamber, said wall having an upper edge with at least a portion lower than said predetermined level for admitting molten metal and dross from the surface of said body to said pool, said wall being disposed and adapted to permit flow of molten metal from said body into said pool only over said upper edge, said wall and said chamber being mutually arranged to permit direct flow of molten metal into said pool from the entire surface of said body, and said spray-projecting means being disposed and adapted to advance dross-carrying molten metal of said body toward said pool;

(b) means providing a well disposed externally of said chamber and extending below said predetermined level for receiving liquid from said pool, said well communicating with the interior of said pool through a first passage opening into said pool at a level below the level of said upper wall edge portion, said well communicating directly with said chamber through a second passage opening into said chamber externally of said pool and at a level below said predetermined level, said well being arranged to permit separation of said refuse material from liquid therein; and (c) means for advancing molten metal and dross downwardly in said pool, to cause circulation of molten metal and dross from said pool into said well through said passage while drawing liquid and dross from the surface of said body into said pool over said wall edge.

References Cited

UNITED STATES PATENTS

| | | | |
|---|---|---|---|
| 2,528,210 | 10/1950 | Stewart | 222—385 X |
| 2,820,705 | 1/1958 | Warner | 75—24 |
| 2,886,309 | 5/1959 | Derham | 266—37 |
| 2,914,398 | 11/1959 | Johnson | 75—68 |
| 3,235,376 | 2/1966 | Hollingshead | 266—34 |
| 3,240,590 | 3/1966 | Schmidt | 75—68 |

JOHN F. CAMPBELL, *Primary Examiner.*

R. F. DROPKIN, *Assistant Examiner.*